(12) United States Patent
Kim et al.

(10) Patent No.: US 9,554,371 B2
(45) Date of Patent: Jan. 24, 2017

(54) METHOD AND DEVICE FOR REPORTING CHANNEL STATE INFORMATION IN WIRELESS COMMUNICATION SYSTEM

(71) Applicant: LG ELECTRONICS INC., Seoul (KR)

(72) Inventors: Kijun Kim, Anyang-si (KR); Jonghyun Park, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 8 days.

(21) Appl. No.: 14/414,864

(22) PCT Filed: Jul. 16, 2013

(86) PCT No.: PCT/KR2013/006345
§ 371 (c)(1),
(2) Date: Jan. 14, 2015

(87) PCT Pub. No.: WO2014/014253
PCT Pub. Date: Jan. 23, 2014

(65) Prior Publication Data
US 2015/0173064 A1    Jun. 18, 2015

Related U.S. Application Data

(60) Provisional application No. 61/672,253, filed on Jul. 16, 2012.

(51) Int. Cl.
*H04L 12/26* (2006.01)
*H04W 72/04* (2009.01)
(Continued)

(52) U.S. Cl.
CPC .......... *H04W 72/0413* (2013.01); *H04B 7/26* (2013.01); *H04B 17/00* (2013.01); *H04L 5/0035* (2013.01);
(Continued)

(58) Field of Classification Search
CPC ..... H04W 24/00; H04L 43/50; H04L 43/0852; H04L 43/08; H04B 17/003
See application file for complete search history.

(56) References Cited

U.S. PATENT DOCUMENTS

2009/0279512 A1* 11/2009 Fujishima ............ H04B 7/0617
370/336
2011/0287792 A1    11/2011 Zhang et al.
(Continued)

FOREIGN PATENT DOCUMENTS

EP            2426972          3/2012
KR    10-2011-0084594          7/2011
(Continued)

OTHER PUBLICATIONS

61557260 Provisional Specification.*
(Continued)

*Primary Examiner* — Hassan Phillips
*Assistant Examiner* — Siren Wei
(74) *Attorney, Agent, or Firm* — Lee Hong Degerman Kang Waimey

(57) ABSTRACT

An embodiment of the present invention relates to a method of reporting channel state information (CSI) of a terminal in which a plurality of CSI-reference resource (RS) configurations is set and includes: receiving information for quasi co-located assumption; measuring a channel state by using the CSI-RS; inducing a modulation and coding scheme (MCS) based on the measured result and the information for the QC assumption; and reporting the CSI including a CQI
(Continued)

index associated with the MCS, wherein if there is a physical cell ID corresponding to the CSI-RS in the information for the QC assumption, the MSC is a value capable of receiving data below a certain error rate if the data, under the assumption of a cell-specific RS (CRS) transmitted from a cell of the physical cell ID and the QC, is received.

12 Claims, 11 Drawing Sheets

(51) Int. Cl.
 H04B 7/26 (2006.01)
 H04B 17/00 (2015.01)
 H04L 5/00 (2006.01)
 H04W 24/08 (2009.01)
 H04W 88/02 (2009.01)

(52) U.S. Cl.
 CPC ............ *H04L 5/0057* (2013.01); *H04W 24/08* (2013.01); *H04L 5/005* (2013.01); *H04W 88/02* (2013.01)

(56) References Cited

U.S. PATENT DOCUMENTS

| | | | |
|---|---|---|---|
| 2011/0305179 A1 | 12/2011 | Wang et al. | |
| 2012/0113844 A1 | 5/2012 | Krishnamurthy | |
| 2012/0155362 A1* | 6/2012 | Montojo | H04W 72/082 370/312 |
| 2013/0114455 A1* | 5/2013 | Yoo | H04W 24/00 370/252 |
| 2013/0279437 A1* | 10/2013 | Ng | H04W 48/16 370/329 |
| 2013/0301542 A1* | 11/2013 | Krishnamurthy | H04W 52/50 370/329 |

FOREIGN PATENT DOCUMENTS

| | | |
|---|---|---|
| KR | 10-2011-0138742 | 12/2011 |
| WO | 2012/075387 | 6/2012 |

OTHER PUBLICATIONS

61635742 Provisional Specification.*
PCT International Application No. PCT/KR2013/006345, Written Opinion of the International Searching Authority dated Oct. 18, 2013, 15 pages.
Alcatel-Lucent, et al., "Further Discussion of Quasi-co-located antenna ports," 3GPP TSG-RAN1 Meeting #69, R1-122458, May 2012, 4 pages.
European Patent Office Application Serial No. 13819354.5, Search Report dated Feb. 1, 2016, 9 pages.

* cited by examiner

FIG. 5
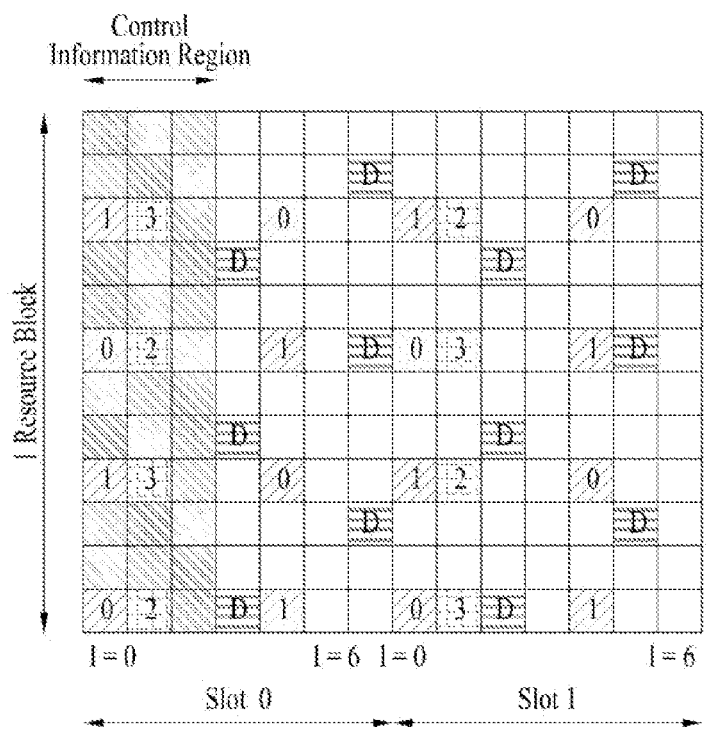
(a)
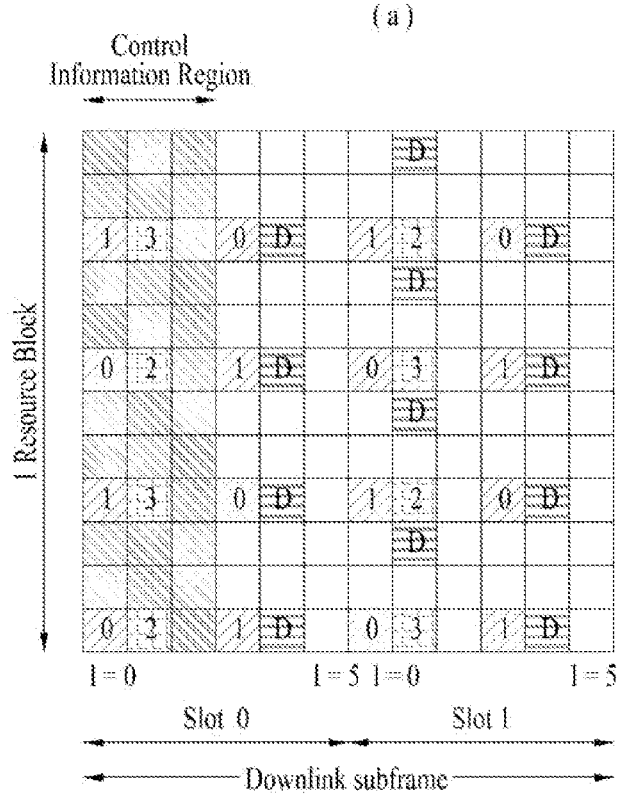
(b)

FIG. 6

FIG. 7
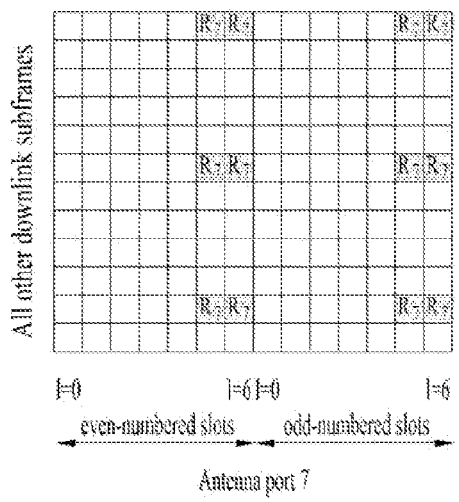
Antenna port 7
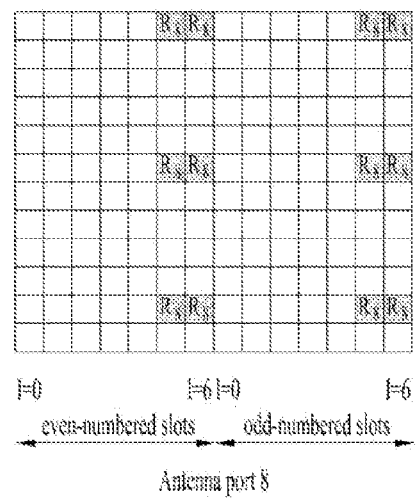
Antenna port 8
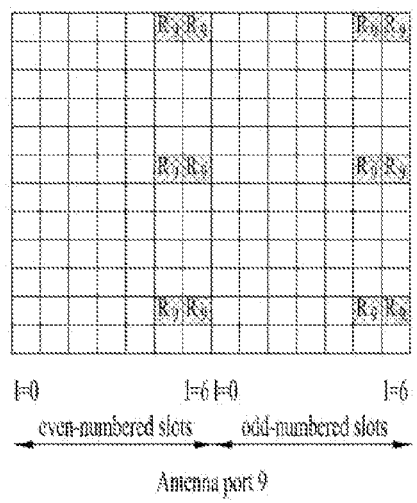
Antenna port 9
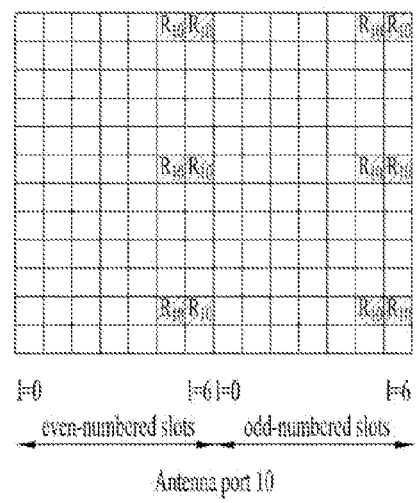
Antenna port 10

FIG. 9
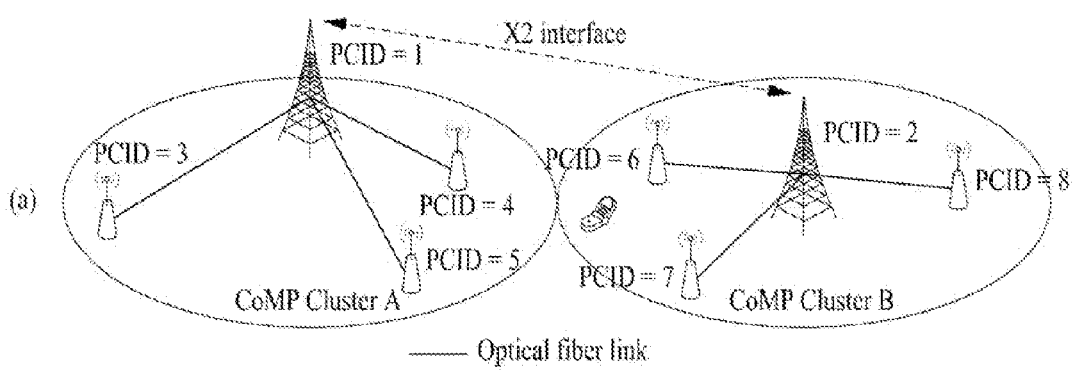
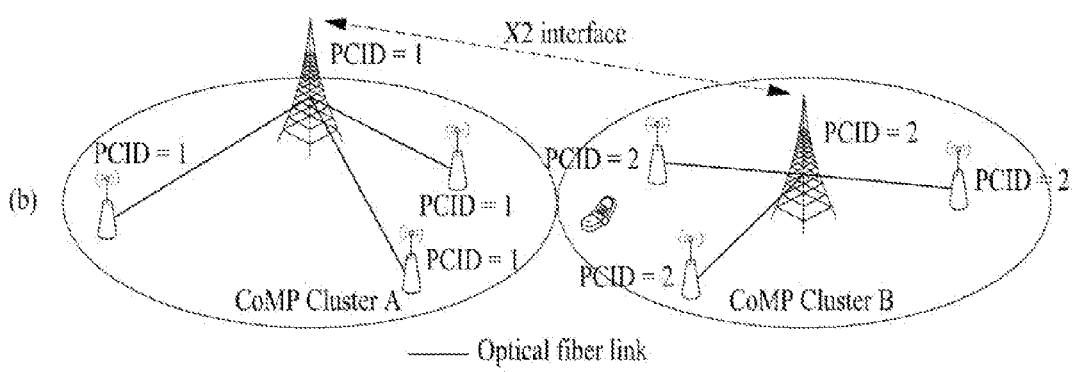

METHOD AND DEVICE FOR REPORTING CHANNEL STATE INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2013/006345, filed on Jul. 16, 2013, which claims the benefit of U.S. Provisional Application Ser. No. 61/672,253, filed on Jul. 16, 2012, the contents of which are hereby incorporated by reference herein in their entirety.

TECHNICAL FIELD

The present disclosure relates to a wireless communication system, and more particularly, to a method and device for transmitting channel state information.

BACKGROUND ART

Wireless communication systems are widely deployed to provide various kinds of communication content such as voice and data services. Generally, these communication systems are multiple access systems capable of supporting communication with multiple users by sharing available system resources (e.g., bandwidth and transmission power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

DISCLOSURE

Technical Problem

An object of the present invention devised to solve the problem lies in a method for reporting channel state information when a quasi co-located (QC) assumption with a cell-specific reference signal of a specific cell is possible.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

According to a first aspect of the present invention, provided herein is a method for reporting channel state information (CSI) by a user equipment (UE) configured with a plurality of CSI-reference resource (RS) configurations in a wireless communication system, the method including receiving information for a Quasi Co-located (QC) assumption, measuring a channel state using a CSI-RS, deriving a modulation and coding scheme (MCS) based on a result from the measuring and the information for the QC assumption, and reporting the CSI containing a CQI index related to the MCS, wherein, when a physical cell ID corresponding to the CSI-RS is present in the information for the QC assumption, the MSC is a value allowing reception of data with an error rate lower than or equal to a predetermined error rate in receiving the data under the QC assumption between a cell-specific reference signal (CRS) transmitted from a cell of the physical cell ID and the CSI-RS.

According to a second aspect of the present invention, provided herein is a user equipment (UE) configured with a plurality of channel state information (CSI)-reference signal (RS) configurations in a wireless communication system, the UE including a receive module, and a processor, wherein the processor is configured to receive information for a Quasi Co-located (QC) assumption, measure a channel state using a CSI-RS, derive a modulation and coding scheme (MCS) based on a result from the measuring and the information for the QC assumption, and report the CSI containing a CQI index related to the MCS, wherein, when a physical cell ID corresponding to the CSI-RS is present in the information for the QC assumption, the MSC is a value allowing reception of data with an error rate lower than or equal to a predetermined error rate in receiving the data under the QC assumption between a cell-specific reference signal (CRS) transmitted from a cell of the physical cell ID and the CSI-RS.

The first and second aspects of the present invention may include the following details.

The information for the QC assumption may indicate QC-assumable physical cell ID with respect to each of the CSI-RS configurations.

The information for the QC assumption may indicate a physical cell ID for which the QC assumption is possible, with respect to a CSI-RS configuration having a QC assumable cell among plurality of the CSI-RS configurations.

When the UE may calculate the number of data resource elements of a CSI reference resource for deriving the MCS, the UE considers the number of ports for the CRS.

A resource element corresponding to the ports for the CRS may be excluded in calculating the number of data resource elements.

The information for the QC assumption may further contain a serving cell CRS rate matching flag.

The serving cell CRS rate matching flag may indicate exclusion of a resource element corresponding to a CRS port of a serving cell in calculating the number of data resource elements of a CSI reference resource for the deriving of the MSC.

The MCS may be a highest MCS among MCSs allowing reception of data with an error rate lower than or equal to a predetermined error rate.

The predetermined error rate may be a block error rate (BLER) lower than or equal to 10%.

Each of the CSI-RS configurations may be included in a coordinated multi-point (CoMP) measurement set.

Reception of the data under the QC assumption between the CRS and the CSI-RS is performed using a large-scale property estimated from a port for the CRS to perform channel estimation for the data.

The large-scale property may include delay spread, Doppler spread, frequency shift, average receive power, and reception timing.

Advantageous Effects

According to embodiments of the present invention, performance of a receiver may be improved by an assumption of QC with a cell-specific reference signal, and channel state information may be correctly reported by reflecting the QC assumption.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings:

FIG. 5 illustrates a reference signal;

FIG. 6 is a diagram illustrating a channel state information reference signal;

FIG. 7 is a diagram illustrating a demodulation reference signal;

FIG. 9 is a diagram illustrating a coordinated multi-point cluster to which an embodiment of the present invention is applicable;

BEST MODE

Figure 1:
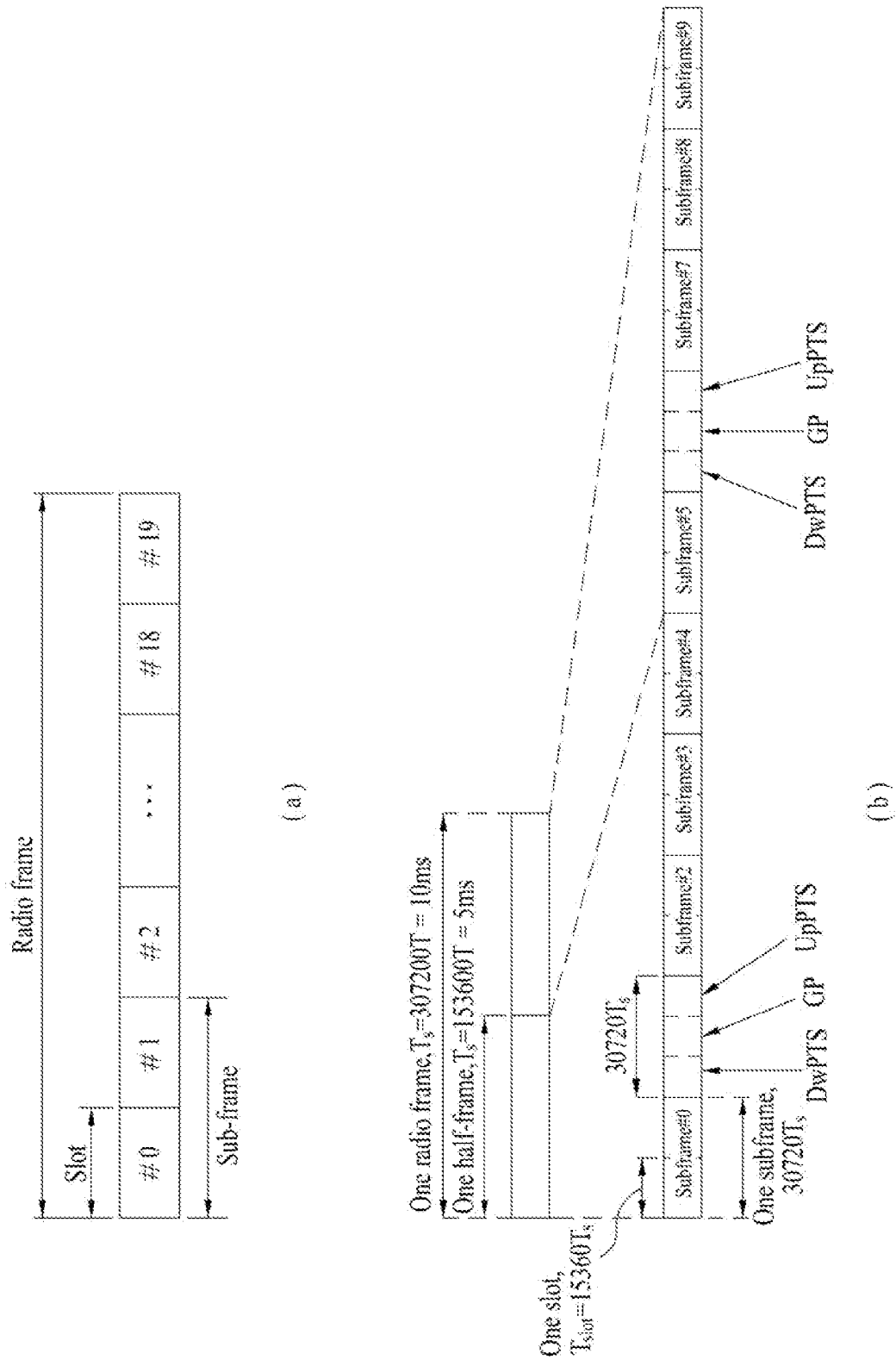
FIG. 1 illustrates a radio frame structure.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)". The name "cell" adopted in the following descriptions may be applied to transmission/reception points such as a base station (or eNB), a sector, a remote radio head (RRH), and a relay, and may be used a general term to identify a component carrier at a specific transmission/reception point.

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and IEEE 802.16m advanced (wirelessMAN-OFDMA advanced system). For clarity, the following description focuses on 3GPP LTE and 3GPP LTE-A systems. However, the spirit of the present invention is not limited thereto.

LTE/LET-A Resource Structure/Channel

Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE employs OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol is extended and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

The illustrated radio frame structures are merely examples, and various modifications may be made to the number of subframes included in a radio frame, the number of slots included in a subframe, or the number of symbols included in a slot.

Figure 2:
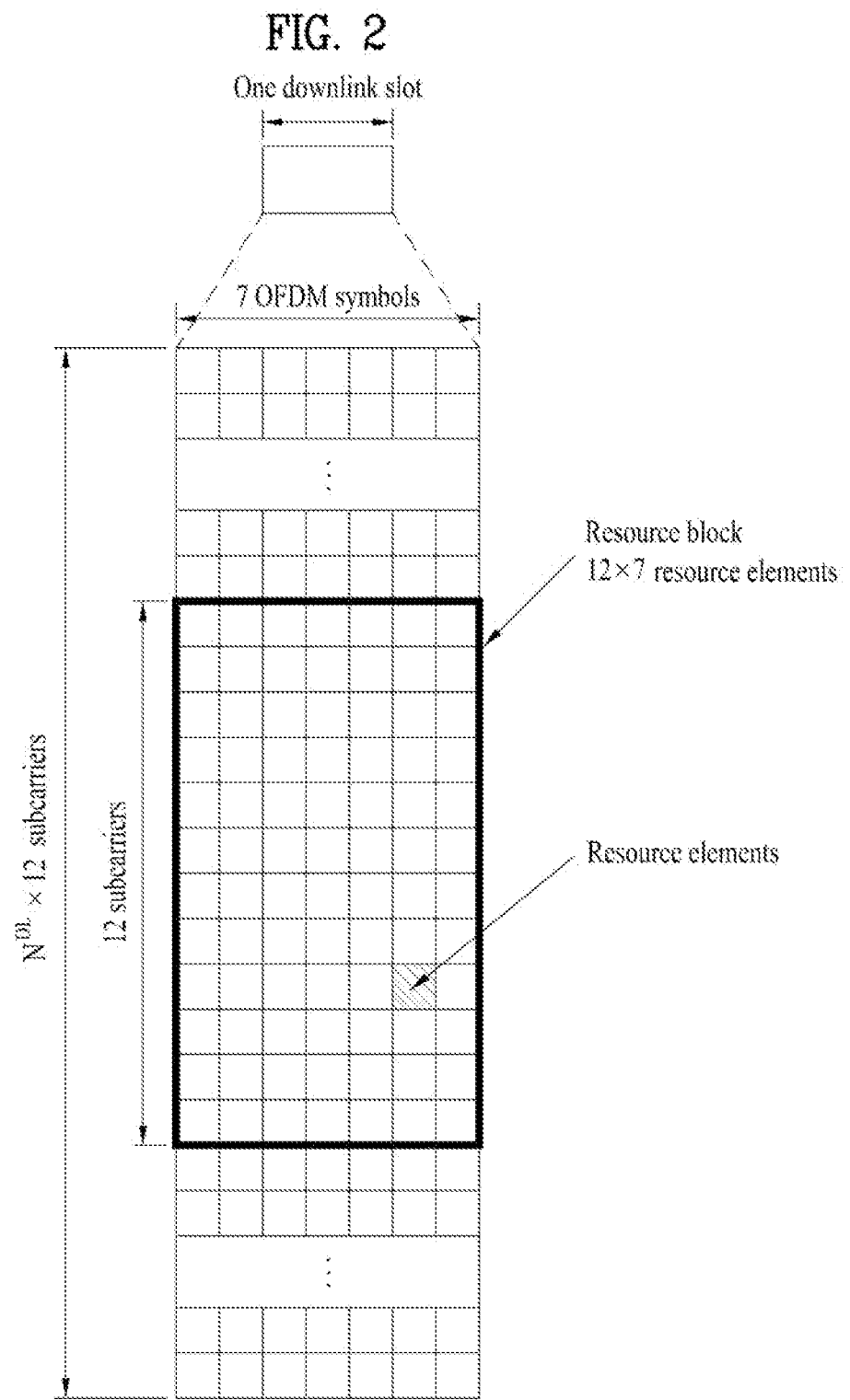
FIG. 2 is a diagram illustrating a resource grid for one downlink (DL) slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a DL transmission bandwidth. A UL slot may have the same structure as a DL slot.

Figure 3:
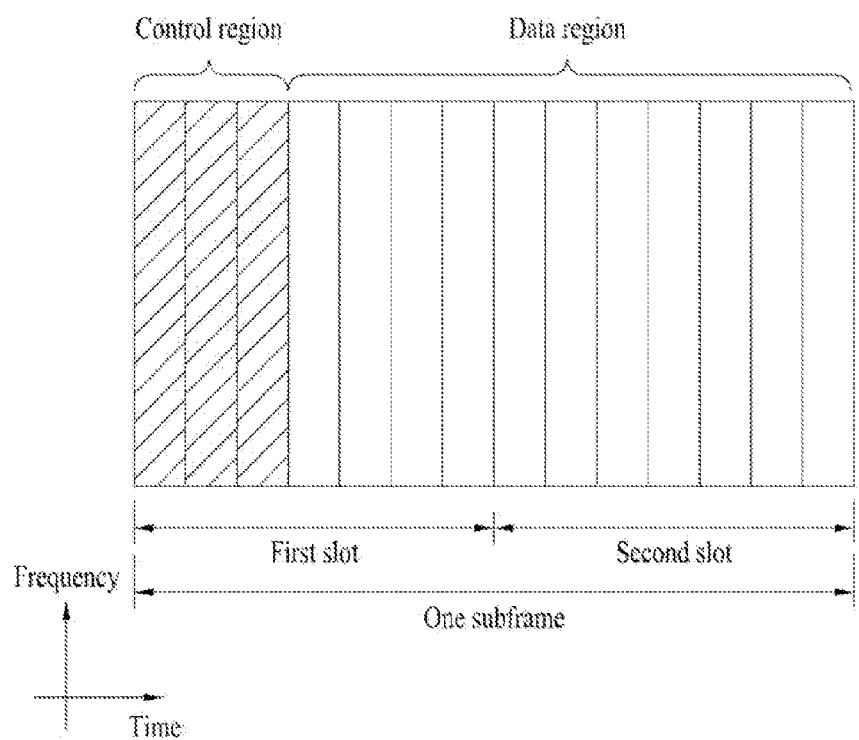
FIG. 3 is a diagram illustrating a DL subframe structure.

FIG. 3 illustrates a DL subframe structure. Up to the first three OFDM symbols of the first slot in a DL subframe are used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about a UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging radio network temporary identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
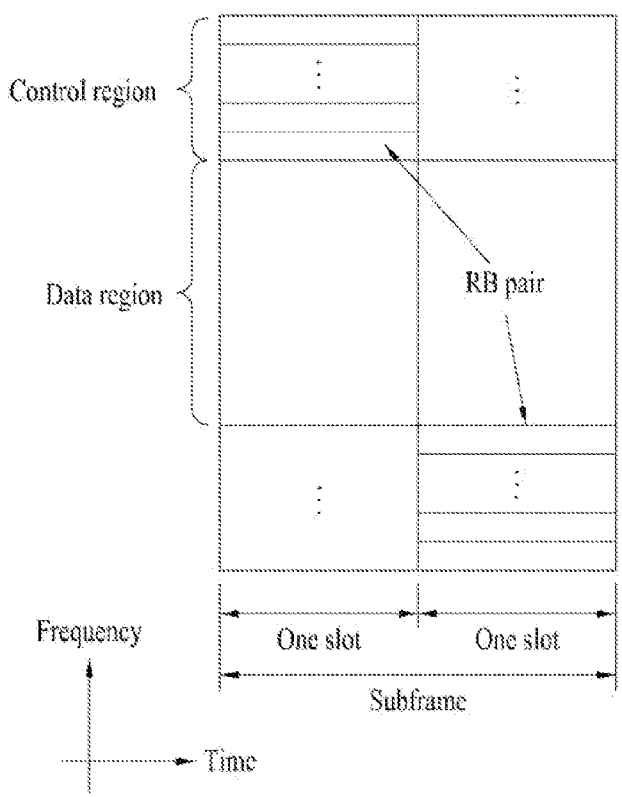
FIG. 4 is a diagram illustrating an uplink (UL) subframe structure.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Reference Signal (RS)

In transmitting packets in a wireless communication system, the packets are transmitted over a radio channel, and therefore signal distortion may occur in the transmission process. For a receiver to receive the correct signal in spite of signal distortion, the received distorted signal should be corrected using channel information. In detecting the channel information, a signal which is known to both the transmitter and the receiver is transmitted and the degree of distortion of the signal received over the channel is used to detect the channel information. This signal is referred to as a pilot signal or a reference signal.

In the case in which data is transmitted and received using multiple antennas, a channel state between a transmit antenna and a receive antenna needs to be identified to receive a correct signal. Accordingly, a separate RS is needed for each transmit antenna and, more particularly, for each antenna port.

RSs may be divided into an UL RS and a DL RS. In the current LTE system, the UL RSs include:

i) a demodulation-reference signal (DM-RS) for channel estimation for coherent demodulation of information transmitted over a PUSCH and a PUCCH; and ii) a sounding reference signal (SRS) for measuring UL channel quality at frequencies of different networks in the BS.

The DL RSs include:

i) a cell-specific reference signal (CRS) shared by all UEs in a cell;

ii) a UE-specific reference signal for a specific UE;

iii) a demodulation-reference signal (DM-RS) transmitted for coherent demodulation in the case of transmission of a PDSCH;

iv) a channel state information-reference signal (CSI-RS) for delivering channel state information (CSI) in the case of transmission of a DL DMRS;

v) a multimedia broadcast single frequency network (MBSFN) reference signal transmitted for coherent demodulation of a signal transmitted in an MBSFN mode, and vi) a positioning reference signal used to estimate geographic position information of a UE.

The RSs may be broadly divided into two reference signals according to the purposes thereof. There are an RS used to acquire channel information and an RS used for data demodulation. Since the former is used when the UE acquires channel information on DL, this RS should be transmitted over a wide band and even a UE which does not receive DL data in a specific subframe should receive the RS. This RS is also applied to situations such as handover. The latter RS is sent by the BS along with a resource on DL. The UE may receive the RS to perform channel measurement to implement data modulation. This RS should be transmitted in a region in which data is transmitted.

The CRS is used for acquisition of channel information and for data demodulation, and the UE-specific RS is used only for data demodulation. The CRS is transmitted in every subframe in a wide band and RSs for up to four antenna ports are transmitted according to the number of transmit antennas of the BS.

For example, if the number of transmit antennas of the BS is 2, CRSs for antenna ports #0 and #1 are transmitted. If the number of transmit antennas of the BS is 4, CRSs for antenna ports #0 to #3 are respectively transmitted.

FIG. 5 is a diagram illustrating a pattern in which CRSs and DRSs defined in a legacy 3GPP LTE system (e.g., Release-8) are mapped to resource block (RB) pairs. A downlink RB pair, as a unit to which an RS is mapped, may be represented as a unit of one subframe in the time domain times 12 subcarriers in the frequency domain. That is, one RB pair has a length of 14 OFDM symbols for a normal CP (FIG. 5(a)) and a length of 12 OFDM symbols for an extended CP (FIG. 5(b)).

FIG. 5 shows locations of RSs on RB pairs in a system in which the BS supports four transmit antennas. In FIG. 5, resource elements (REs) denoted by "0", "1", "2" and "3" represent the locations of the CRSs for antenna port indexes 0, 1, 2 and 3, respectively. In FIG. 5, REs denoted by "D" represent locations of the DMRSs.

Channel State Information-RS (CSI-RS)

The CSI-RS, which is designed for the LTE-A system supporting up to eight antenna ports on downlink, is a reference signal intended for channel measurement. The CSI-RS is different from the CRS which is intended for channel measurement and data demodulation. Accordingly, the CSI-RS does not need to be transmitted in every subframe, unlike the CRS. The CSI-RS is used in transmission mode 9, and the DMRS is transmitted for data demodulation.

More specifically, the CSI-RS may be transmitted through antenna ports 1, 2, 4, and 8. When a single antenna port is used, it may be antenna port 15. If two antenna ports are used, they may be antenna ports 15 and 16. If four antenna ports are used, they may be antenna ports 15 to 18. If eight antenna ports are used, they may be antenna ports 15 to 22.

A CSI-RS may be generated using Equation 1 given below.

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \cdots, N_{RB}^{max,DL} - 1$$

Equation 1

Herein, $r_{l,n_s}(m)$ denotes a generated CSI-RS, $c(i)$ denotes a pseudo random sequence, $n_s$ denotes the slot number, l denotes an OFDM symbol, and $N_{RB}^{max,DL}$ denotes the maximum number of RBs of a DL bandwidth.

The CSI-RS generated through Equation 1 may be mapped to an RE for each antenna port, using Equation 2 given below.

$$a_{k,l}^{(p)} = w_{l''} \cdot r_{l,n_s}(m')$$

Equation 2

$$k = k' + 12m +
\begin{cases}
-0 & \text{for } p \in \{15, 16\}, \quad \text{normal cyclic prefix} \\
-6 & \text{for } p \in \{17, 18\}, \quad \text{normal cyclic prefix} \\
-1 & \text{for } p \in \{19, 20\}, \quad \text{normal cyclic prefix} \\
-7 & \text{for } p \in \{21, 22\}, \quad \text{normal cyclic prefix} \\
-0 & \text{for } p \in \{15, 16\}, \quad \text{extended cyclic prefix} \\
-3 & \text{for } p \in \{17, 18\}, \quad \text{extended cyclic prefix} \\
-6 & \text{for } p \in \{19, 20\}, \quad \text{extended cyclic prefix} \\
-9 & \text{for } p \in \{21, 22\}, \quad \text{extended cyclic prefix}
\end{cases}$$

$$l = l' +
\begin{cases}
l'' & \text{CSI reference signal configurations 0-19,} \quad \text{normal cyclic prefix} \\
2l'' & \text{CSI reference signal configurations 20-31,} \quad \text{normal cyclic prefix} \\
l'' & \text{CSI reference signal configurations 0-27,} \quad \text{extended cyclic prefix}
\end{cases}$$

-continued $$w_{l''} = \begin{cases} 1 & p \in \{15, 17, 19, 21\} \\ (-1)^{l''} & p \in \{16, 18, 20, 22\} \end{cases}$$

$l'' = 0, 1$ $m = 0, 1, \cdots, N_{RB}^{DL} - 1$ $m' = m + \left\lfloor \dfrac{N_{RB}^{max,DL} - N_{RB}^{DL}}{2} \right\rfloor$ In Equation 2, k' and l' may be determined according to CSI-RS configurations as shown in Table 1 below.

TABLE 1

|  |  | Number of CSI reference signals configured | | | | | |
|---|---|---|---|---|---|---|---|
| CSI reference signal | | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

Figure 6:
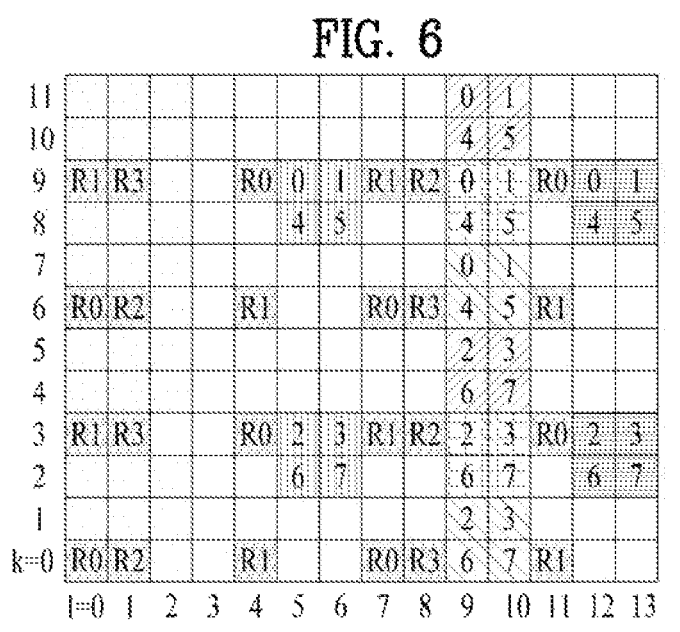

For a specific CSI-RS according to Equation 2 and Table 1, mapping to REs is performed for each antenna port. FIG. 6 shows mapping of CSI-RSs according to antenna ports as described above. In FIG. 6, R0 to R3 respectively represent mapping of CRSs according to antenna ports, and the number indications represent mapping of CSI-RSs according to antenna ports. For example, REs indicated by numbers 0 or 1 represent mapping of a CSI-RS corresponding to antenna port 0 or 1. In this case, CSI-RSs corresponding to two antenna ports are mapped to the same RE, and may be distinguished by different orthogonal codes.

Next, as described above, the CSI-RS may be transmitted in a specific subframe rather than in every subframe. Specifically, the CSI-RS may refer to CSI-RS subframe configurations as listed in Table 2 given below, and be transmitted in a subframe satisfying Equation 3.

$$(10 n_f + \lfloor n_s/2 \rfloor - \Delta_{CSI-RS}) \bmod T_{CSI-RS} = 0 \quad \text{Equation 3}$$

In Table 2, $T_{CSI-RS}$ denotes periodicity of transmission of a CSI-RS, $\Delta_{CSI-RS}$ denotes an offset value, $n_f$ denotes a system frame number, and $n_s$ denotes a slot number.

The CSI-RS may be signaled to a UE as a CSI-RS configuration information element (CSI-RS-Config-r10), as shown in Table 3.

TABLE 3

| CSI-RS-Config-r10 ::= | SEQUENCE { |
|---|---|
| csi-RS-r10 | CHOICE { |
| release | NULL, |
| setup | SEQUENCE { |

TABLE 3-continued

```
        antennaPortsCount-r10         ENUMERATED
{an1, an2, an4, an8},
        resourceConfig-r10            INTEGER (0..31),
        subframeConfig-r10            INTEGER (0..154),
        p-C-r10                       INTEGER
                                      (-8..15)
        }
    }
                                      OPTIONAL, -- Need ON
    zeroTxPowerCSI-RS-r10             CHOICE {
        release                           NULL,
        setup                             SEQUENCE {
            zeroTxPowerResourceConfigList-r10  BIT STRING (SIZE
(16)),
            zeroTxPowerSubframeConfig-r10      INTEGER (0..154)
        }
    }
                                      OPTIONAL   -- Need ON
}
```

In Table 3, 'antennaPortsCount' carries the number (selected among 1, 2, 4, and 8) of antennas through which the CSI-RS is transmitted, 'resourceConfig' carries an RE in which the CSI-RS is positioned in an RB in time-resource frequency, and 'subframeConfig' carries a subframe in which the CSI-RS is transmitted and a CSI-RS EPRE to PDSCH EPRE value. Additionally, the eNB delivers information about a zero power CSI-RS.

In CSI-RS Config, 'resourceConfig' indicates the position at which the CSI-RS is transmitted. This parameter indicates accurate positions of a symbol and a carrier in an RB according to CSI-RS configuration numbers in Table 1 represented as 0 to 31.

Channel State Information (CSI) Feedback

MIMO schemes may be classified into an open-loop MIMO scheme and a closed-loop MIMO scheme. In the open-loop MIMO scheme, a MIMO transmitter performs MIMO transmission without receiving CSI feedback from a MIMO receiver. In the closed-loop MIMO scheme, the MIMO transmitter receives CSI feedback from the MIMO receiver and then performs MIMO transmission. In the closed-loop MIMO scheme, each of the transmitter and the receiver may perform beamforming based on CSI to achieve a multiplexing gain of MIMO transmit antennas. To allow the receiver (e.g., a UE) to feed back CSI, the transmitter (e.g., an eNB) may allocate a UL control channel or a UL-SCH to the receiver.

The CSI feedback may include a rank indicator (RI), a precoding matrix index (PMI), and a channel quality indicator (CQI).

The RI is information about a channel rank. The channel rank indicates the maximum number of layers (or streams) that may carry different information in the same time-frequency resources. Since the rank is determined mainly according to long-term fading of a channel, the RI may be fed back in a longer period than the PMI and the CQI.

The PMI is information about a precoding matrix used for transmission of a transmitter and has a value reflecting the spatial characteristics of a channel. Precoding refers to mapping transmission layers to transmit antennas. A layer-antenna mapping relationship may be determined according to a precoding matrix. The PMI is the index of an eNB precoding matrix preferred by the UE based on a metric such as signal-to-interference-plus-noise ratio (SINR). In order to reduce the feedback overhead of precoding information, the transmitter and the receiver may pre-share a codebook including multiple precoding matrices, and only the index indicating a specific precoding matrix in the codebook may be fed back.

In a system supporting an extended antenna configuration (e.g. an LTE-A system), additional acquisition of multi user-multi input multi output (MU-MIMO) diversity using an MU-MIMO scheme is considered. In the MU-MIMO scheme, when an eNB performs downlink transmission using CSI fed back by one UE among multiple users, it is necessary to prevent interference with other UEs because there is an interference channel between UEs multiplexed in the antenna domain. Accordingly, CSI of higher accuracy than CSI in a single-user (SU)-MIMO scheme should be fed back in order to correctly perform MU-MIMO operation.

A new CSI feedback scheme may be adopted by modifying conventional CSI including an RI, a PMI, and a CQI so as to more accurately measure and report CSI. For example, precoding information fed back by the receiver may be indicated by a combination of two PMIs. One of the two PMIs (a first PMI) has a long-term and/or wideband property, and may be referred to as W1. The other PMI (a second PMI) has a short-term and/or subband property, and may be referred to as W2. A final PMI may be determined by a combination (or a function) of W1 and W2. For example, if the final PMI is denoted by W, W=W1*W2 or W=W2*W1.

The CQI is information indicating channel quality or channel strength. The CQI may be expressed as an index corresponding to a predetermined modulation and coding scheme (MCS) combination. That is, a CQI index that is fed back indicates a corresponding modulation scheme and code rate. In general, the CQI has a value reflecting a reception SNR that can be achieved when an eNB configures a spatial channel using the PMI.

The CSI feedback scheme is divided into periodic reporting over a physical uplink control channel (PUCCH) and aperiodic reporting over a PUSCH, which is an uplink data channel, according to a request from an eNB.

CSI Reference Resource

In LTE/LTE-A, a CSI reference resource related to channel measurement for CSI feedback/reporting described above is defined. In the frequency domain, the CSI reference resource is defined as a group of physical RBs corresponding to a frequency band associated with a calculated CQI. In the time domain, the CSI reference resource is defined as n-nCQI_ref. Herein, n indicates a subframe in which the CSI is transmitted/reported, and nCQI_ref indicates: i) the least value corresponding to a valid subframe among the values greater than or equal to 4 in the case of periodic CSI reporting, ii) a valid subframe corresponding to a subframe in which a CSI request in an uplink DCI format is transmitted in the case of aperiodic CSI reporting; or iii) 4 in the case of a CSI request in the random access response grant in aperiodic CSI reporting. The valid subframe means that it satisfies the following conditions: the subframe should be a DL subframe for the UE; the subframe should not be an MBSFN subframe in modes other than transmission mode 9 environment with a frequency; the DwPTS should be longer than a certain size in TDD; the subframe should not be included in a measurement gap set for the UE; and if a CSI subframe set is configured for the UE in periodic CSI reporting, the subframe should be an element of the CSI subframe set. The CSI subframe set ($C_{CSI,0}$, $C_{CSI,1}$) may be configured for the UE by a higher layer. In the current standard, a CSI reference resource is defined to be included in one of two subframe sets ($C_{CSI,0}$ and $C_{CSI,1}$) but not in both sets.

Demodulation Reference Signal (DMRS)

DMRS is a reference signal defined to allow a UE to perform channel estimation for a PDSCH. The DMRS may be used in transmission modes 7, 8 and 9. The DMRS was initially defined as an RS for single layer transmission of antenna port 5. Over time, the definition has expanded to cover spatial multiplexing of up to eight layers. As the term "UE-specific RS", which is another name for the DMRS, suggests, the DMRS is transmitted only for a single specific UE, and accordingly it may be transmitted only in RBs in which a PDSCH for the specific UE is transmitted.

Hereinafter, description will be given of generation of a DMRS for up to eight layers. The DMRS may be transmitted with a reference-signal sequence r(m), which is generated according to Equation 4 given below, and mapped to complex-valued modulation symbols $a_{k,l}^{(p)}$, which are generated according to Equation 5 given below. FIG. 7 illustrates antenna ports 7 to 10 with the DMRS mapped to a resource grid in subframes according to Equation 2 in the case of a normal CP.

$$r(m) = \frac{1}{\sqrt{2}}(1 - 2 \cdot c(2m)) + j\frac{1}{\sqrt{2}}(1 - 2 \cdot c(2m+1)),$$ Equation 4

$$m = \begin{cases} 0, 1, \cdots, 12N_{RB}^{max,DL} - 1 & \text{Normal } CP \\ 0, 1, \cdots, 16N_{RB}^{max,DL} - 1 & \text{Extended } CP \end{cases}$$

Herein, r(m) denotes a reference-signal sequence, c(i) denotes a pseudo-random sequence, and $N_{RB}^{max,DL}$ denotes a maximum number of RBs of a downlink bandwidth.

$$a_{k,l}^{(p)} = w_p(l') \cdot r(3 \cdot l' \cdot N_{RB}^{max,DL} + 3 \cdot n_{PRB} + m')$$ Equation 5

$$w_p(i) = \begin{cases} \bar{w}_p(i) & (m' + n_{PRB})\bmod 2 = 0 \\ \bar{w}_p(3-i) & (m' + n_{PRB})\bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l'\bmod 2 + 2 & \text{for special subframe configurations 3, 4, 8 and 9} \\ l'\bmod 2 + 2 + 3\lfloor l'/2 \rfloor & \text{for special subframe configurations 1, 2, 6 and 7} \\ l'\bmod 2 + 5 & \text{for subframes other than the special subframes} \end{cases}$$

$$l' = \begin{cases} 0, 1, 2, 3 & n_s\bmod 2 = 0, \text{ and special subframe configurations 1, 2, 6 and 7} \\ 0, 1 & n_s\bmod 2 = 0, \text{ and special subframe configurations 1, 2, 6 and 7} \\ 2, 3 & n_s\bmod 2 = 1, \text{ and configurations other than special subframe configurations 1, 2, 6 and 7} \end{cases}$$

$$m' = 0, 1, 2$$

As can be seen from Equation 5 above, when a reference-signal sequence is mapped to complex demodulation symbols, an orthogonal sequence $\bar{w}_p(i)$ shown in Table 4 below is applied according to antenna ports.

TABLE 1

| Antenna port $p$ | [$\bar{w}_p(0)$ $\bar{w}_p(1)$ $\bar{w}_p(2)$ $\bar{w}_p(3)$] |
|---|---|
| 7  | [+1 +1 +1 +1] |
| 8  | [+1 −1 +1 −1] |
| 9  | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

The DMRSs may be used to perform channel estimation using different methods according to the spreading factor (2 or 4). Referring to Table 1, the spreading factor for antenna ports 7 to 10 is 2 since the orthogonal sequences for the antenna ports are repeated in the pattern of [a b a b]. The spreading factor for antenna ports 11 to 14 is 4. When the spreading factor is 2, a UE may perform channel estimation by despreading the DMRS of the first slot and the DMRS of the second slot respectively using the spreading factor of 2 and then performing time interpolation. When the spreading factor is 4, channel estimation may be performed by despreading the DMRSs in all subframes simultaneously using the spreading factor of 4.

When the spreading factor is 2, channel estimation according to the spreading factor may obtain a gain according to application of time interpolation in high mobility situations and a gain in decoding time according to despreading allowed for the DMRS of the first slot. When the spreading factor of 4 is used, more UEs or a higher rank can be supported.

Heterogeneous Deployments

Figure 8:
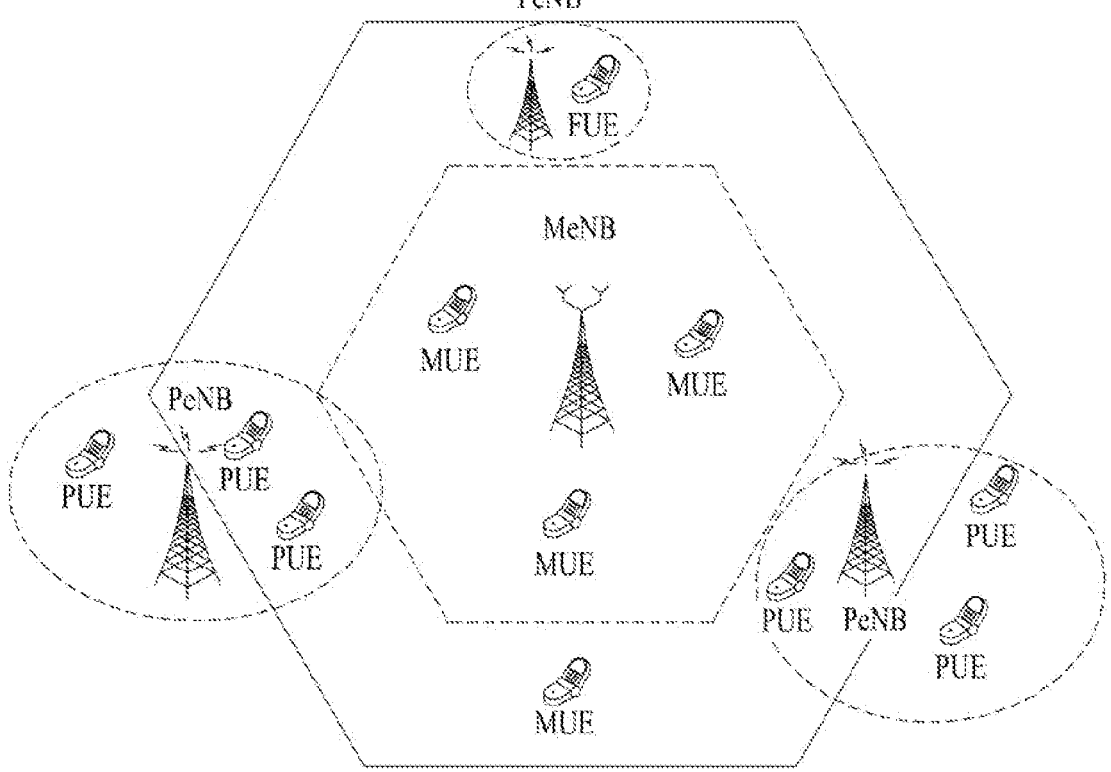
FIG. 8 is a diagram illustrating a heterogeneous network environment.

FIG. 8 illustrates a heterogeneous network wireless communication system including a macro eNB (MeNB) and micro eNBs (PeNBs or FeNBs). The term "heterogeneous network" employed in this specification refers to a network in which an MeNB and a PeNB or FeNB coexist while they use the same radio access technology (RAT).

The MeNB represents a normal eNB of a wireless communication system which has wide coverage and high transmission power. The MeNB may be referred to as a macro cell.

The PeNB or FeNB may be referred to as, for example, a micro cell, a pico cell, a femto cell, a home eNB (HeNB), a relay, etc. (the exemplified PeNB or FeNB and MeNB may be collectively referred to as transmission points (TPs)). The PeNB or FeNB, which is a micro version of the MeNB, can independently operate while performing most functions of the MeNB. The PeNB or FeNB is a non-overlay type eNB that may be overlaid in an area covered by the MeNB or in a shadow area that is not covered by the MeNB. The PeNB or FeNB may cover a fewer UEs than the MeNB while having a narrower coverage and lower transmission power than the MeNB.

A UE (hereinafter, referred to as a macro-UE (MUE)) may be directly served by the MeNB or a UE (hereinafter, referred to as a micro-UE) may be served by the PeNB or FeNB. In some cases, a PUE present in the coverage of the MeNB may be served by the MeNB.

PeNBs or FeNBs may be classified into two types according to whether or not UE access is limited.

The first type is an open access subscriber group (OSG) or non-closed access subscriber group (non-CSG) eNB and corresponds to a cell that allows access of the existing MUE or a PUE of another PeNB. For the existing MUE, handover to an OSG type eNB is possible.

The second type is a CSG eNB which does not allow access of the existing MUE or a PUE of a different PeNB. Accordingly, handover to the CSG eNB is impossible.

Coordinated Multi-Point (CoMP)

To satisfy enhanced system performance requirements for the 3GPP LTE-A system, CoMP transmission and reception technology (also called co-MIMO, collaborative MIMO or network MIMO) has been proposed. The CoMP technology may increase performance of UEs located at a cell edge and the average sector throughput.

In a multi-cell environment with a frequency reuse factor set to 1, the performance of a UE located at a cell edge and average sector throughput may be lowered due to inter-cell interference (ICI). To attenuate ICI, the legacy LTE/LTE-A system has adopted a simple passive technique such as fractional frequency reuse (FFR) based on UE-specific power control such that a UE located at a cell edge may have appropriate throughput performance in an environment constrained by interference. However, attenuating the ICI or reusing ICI as a desired signal for the UE may be more desirable than using fewer frequency resources per cell. To this end, a CoMP transmission technique may be employed.

CoMP schemes applicable to downlink may be broadly classified into joint processing (JP) and coordinated scheduling/beamforming (CS/CB).

According to the JP scheme, data can be used by each transmission point (eNB) of a CoMP cooperation unit. The CoMP cooperation unit refers to a set of eNBs used for a CoMP transmission scheme. The JP scheme may be further divided into joint transmission and dynamic cell selection.

Joint transmission refers to a technique of simultaneously transmitting PDSCHs from a plurality of transmission points (a part or the entirety of a CoMP cooperation unit). That is, a plurality of transmission points may simultaneously transmit data to a single UE. With the joint transmission scheme, the quality of a received signal may be coherently or non-coherently improved, and interference with other UEs may be actively eliminated.

Dynamic cell selection is a technique of transmitting a PDSCH from one transmission point (of a CoMP cooperation unit) at a time. That is, one transmission point transmits data to a single UE at a given time point, while the other transmission points in the CoMP cooperation unit do not transmit data to the UE at the time point. A transmission point to transmit data to a UE may be dynamically selected.

Meanwhile, in the CS/CB scheme, CoMP cooperation units may cooperatively perform beamforming for data transmission to a single UE. While data is transmitted to the UE only from a serving cell, user scheduling/beamforming may be determined through coordination of cells of the CoMP cooperation units.

In the case of uplink, CoMP reception refers to reception of a signal transmitted through cooperation among a plurality of geographically separated transmission points. CoMP schemes applicable to uplink may be classified into joint reception (JR) and coordinated scheduling/beamforming (CS/CB).

The JR scheme indicates that a plurality of reception points receives a signal transmitted through a PUSCH. The CS/CB scheme indicates that only one point receives a PUSCH, and user scheduling/beamforming is determined by coordination of the cells of the CoMP unit.

With a CoMP system as above, multi-cell base stations may jointly support data for a UE. In addition, the base stations may simultaneously support one or more UEs using the same radio frequency resources, thereby increasing system performance. Moreover, a base station may perform space division multiple access (SDMA) based on CSI between the UE and the base station.

In the CoMP system, a serving eNB and one or more cooperative eNBs are connected to a scheduler over a backbone network. The scheduler may receive channel information about the channel states between each UE and cooperative eNBs measured and fed back by the cooperative eNBs over the backbone network, and operate based on the channel information. For example, the scheduler may schedule information for a cooperative MIMO operation for the serving eNB and the one or more cooperative eNBs. That is, the scheduler may directly give each eNB a command to perform the cooperative MIMO operation.

As noted from the above description, it can be said that the CoMP system operates as a virtual MIMO system by grouping a plurality of cells into one group. Basically, the CoMP system may adopt a MIMO communication scheme employing multiple antennas.

FIG. 9 illustrates a CoMP cluster. A CoMP cluster refers to a CoMP cooperation unit mentioned above. FIG. 9(a) illustrates a case in which cells in a CoMP cluster use different physical cell IDs (PCIDs), and FIG. 9(b) illustrates a case in which cells in a CoMP cluster use the same PCID. Even in the case that the cells use the same PCID in a CoMP cluster, the CoMP clusters (CoMP clusters A and B in FIG. 9(b)) may use different PCIDs, and the cells in a single cluster may be configured in the form of a distributed antenna of an eNB or an RRH by sharing a PCID. In a variation, some of the cells in a cluster may share a PCID.

If the cells share the PCID, all the cells having the same PCID may transmit a common signal such as a primary synchronization signal (PSS)/secondary synchronization signal (SSS), a CRS, a PBCH, or a CRS-based PDCCH/PDSCH at the same time. Thereby improving quality of received signals and removing the communication shadow area. Alternatively, some cells having higher transmission power than may transmit a common signal among the cells having the same PCID, and the other cells may not transmit a common signal. However, in the case of unicast data transmission through a CSI-RS, a UE-specific RS and a UE-specific RS-based PDSCH, each cell may individually perform transmission, and have a cell splitting gain.

Quasi Co-Located (QC)

Before description of embodiments of the present invention, a new concept applied to all the embodiments described above will be defined. The present specification employs the term "quasi co-located (QC)". This has the following meaning. For example, when two antenna ports are given, and a large-scale property of a wireless channel over which a symbol is delivered through one antenna port can be inferred from another wireless channel over which a symbol is delivered through the other antenna port, the two antenna ports may be said to be QC. Herein, the large-scale property includes at least one of a delay spread, Doppler spread, a Doppler shift, an average gain, and an average delay.

In other words, two antenna ports being QC means that the large-scale property of a wireless channel from one antenna port can be identical that of a wireless channel from the other antenna port. Considering a plurality of antenna ports on which RSs are transmitted, when antenna ports on which RSs of two different kinds are transmitted become QC, the large-scale property of a wireless channel from antenna ports of one kind may be replaced with the large-scale property of a wireless channel from antenna ports of the other kind.

According to the concept of QC, the UE cannot assume that wireless channels from non-QC (NQC) antenna ports have the same large-scale property. In this case, the UE needs to perform independent processing for each configured NQC antenna port regarding timing acquisition and tracking, frequency offset estimation and compensation, delay estimation, and Doppler estimation.

For antenna ports for which QC can be assumed, the UE can perform the following operations:

Regarding delay spread and Doppler spread, the UE may apply power-delay-profile, delay spread and Doppler spectrum and Doppler spread estimation result for a wireless channel from one antenna port to a Wiener filter which is used in performing channel estimation for a radio channel from another antenna port;

Regarding frequency shift and reception timing, after the UE performs time and frequency synchronization for an antenna port, it may apply the same synchronization to demodulation on another antenna port.

Regarding average received power, the UE may average reference signal received power (RSRP) measurements for two or more antenna ports.

Once the UE receives a specific DMRS-based DL-related DCI format over a control channel (PDCCH or ePDCCH), the UE performs channel estimation for the PDSCH through a DMRS sequence and then performs data demodulation. For example, if the UE can make a QC assumption between a configuration of antenna ports (hereinafter, referred to as "DMRS port") for transmission of a DMRS that the UE receives from a DL scheduling grant and antenna ports (hereinafter, referred to as "CRS port") for transmission of a CRS of the DL serving cell of the UE or another cell, the UE may apply the estimated value for the large-scale property of a radio channel estimated through the CRS port to perform channel estimation through the DMRS port, thereby improving performance of the processor of a DMRS-based receiver.

This is because the CRS is a reference signal that is broadcast with a relatively high density over the full band in every subframe as described above, and thus in usual cases an estimated value of the large-scale property can be more stably acquired from the CRS. On the other hand, the DMRS is UE-specifically transmitted on specific scheduled RBs, and a effective channel received by the UE may change on a PRG-by-PRG basis since the precoding matrix that the eNB uses for transmission of the DMRS may change on the PRG-by-PRG basis. Therefore, even if multiple PRGs are scheduled, using the DMRS for estimation of the large-scale property of a radio channel over a wide band may result in performance degradation. For the CSI-RS, the transmission period thereof may range from a few milliseconds to tens of milliseconds, and the average density thereof is as low as 1 RE (or 2RE when CDM is applied) per antenna port per RB. Accordingly, using the CSI-RS for estimation of the large-scale property of a radio channel may also result in performance degradation.

QC Between CSI-RS and Serving Cell CRS

In a case in which the UE receives a first CSI-RS configuration (hereinafter, referred to as "CSI-RS 1") for QC and a second CSI-RS configuration (hereinafter, referred to as "CSI-RS 2") for NQC which have a QC/NQC assumption or relationship with CRS port(s) from a specific cell (e.g., the DL serving cell), the UE may calculate and report CSI for a specific CSI-RS configuration (i.e., CSI-RS 1) which can establish a QC assumption with the cell (e.g., the DL serving cell) by calculating an MCS level, CQI, RI and corresponding PMI with which the UE can achieve 10% FER when the UE receives a DMRS-based PDSCH later and performs data demodulation under the QC assumption between the DMRS port(s) and the CRS port(s) from the cell (e.g., the DL serving cell). In addition, the UE may calculate the CQI and the like by applying a specific scaling value to a ratio (Pc) between PDSCH EPRE (energy per resource element) and CSI-RS EPRE, which is contained in the CSI-RS configuration. As CSI-RS 2 is configured as being NQC, it cannot have a QC assumption with CRS port(s) from a cell (e.g., the DL serving cell) which has transmitted CSI-RS 2. Accordingly, when the UE receives a DMRS-based PDSCH later from the cell, the UE may calculate and report an MCS level, CQI, RI and corresponding PMI which allow the UE to achieve 10% FER in performing data demodulation without the QC assumption. For example, the UE may calculate the CSI and report a lower value of the CSI than when the QC assumption is possible.

QC Between CSI-RS and Another CSI-RS

Information indicating whether or not CSI-RS port(s) of a CSI-RS configuration and CSI-RS port(s) of another CSI-RS configuration have a QC/NQC relation may also be included in the configurations.

For example, certain identifier information may be included in each CSI-RS configuration to signal that QC can be assumed between CSI-RS ports having the same identifier information. This may mean that QC assumption can be made between CSI-RS ports which respectively have identifier information which is N bits in length and set to the same value. For example, if an eNB uses L*M panel antennas for 3-D beamforming, the eNB may signal that QC is possible between multiple CSI-RS configurations established on the eNB, such that the CSI-RS ports under QC relationship can share all or some of the estimated values of the large-scale properties. Thereby, a processing load or complexity of the UE receiver may be reduced. QC assumption may not be applied to the average gain, which is one of the large-scale properties, by nature of the 3-D beamforming gain.

According to another embodiment, when the UE receives one or more CSI-RS configuration(s), a specific flag bit may be assigned to each CSI-RS configuration allow the UE to recognize a CSI-RS configuration group as a different CSI-RS configuration group capable of establishing another QC assumption whenever the flag bit is toggled. Specifically, suppose that the UE receives 5 CSI-RS configurations (e.g., CSI-RS 1, CSI-RS 2, . . . , and CSI-RS 5). If the flag bit is set to 0 for CSI-RS 1 and CSI-RS 2, is set to 1 for CSI-RS 3 and CSI-RS 4, and toggled to 0 for CSI-RS 5, this indicates that a QC assumption is possible for {CSI-RS 1, CSI-RS 2}, another QC assumption is possible for {CSI-RS 3, CSI-RS 4}, and a QC assumption is possible for {CSI-RS 5} alone. Accordingly, CSI-RS 5 may indicate NQC which means that CSI-RS 5 substantially cannot establish a QC assumption with any other CSI-RS configurations.

According to another embodiment, regarding an X value (e.g., a physical cell identifier, a virtual cell identifier, a scrambling identifier, or an initial value), which is a CSI-RS sequence scrambling seed included in each CSI-RS configuration, a QC/NQC assumption may be indicated depending on whether or not CSI-RS configurations have the same X value. If the X values included in CSI-RS configurations are equal to each other, it may be implicitly indicated that a QC assumption is possible between the corresponding CSI-RS port(s). On the other hand, for CSI-RS configurations including different X values, NQC is naturally assumed between the corresponding CSI-RS port(s).

Additionally, the X value may be individually allocated to each CSI-RS port included in a CSI-RS configuration. In this case, the QC or NQC assumption may be implicitly indicated depending on whether or not the X values are equal to each other.

QC Between CSI-RS and DMRS

Indication information about whether QC/NQC is assumed between CSI-RS port(s) and DMRS port(s) may be included in a CSI-RS configuration.

For example, QC/NQC assumption between CSI-RS port(s) and specific DMRS port(s) may be set for each CSI-RS configuration through RRC. If the UE receives CSI-RS 1 which is set to have a QC assumption with all DMRS port(s), the UE may apply an estimated value of a specific large-scale property of CSI-RS 1 to reception processing of a DMRS-based PDSCH that the UE receives thereafter. This means that the eNB will transmit the PDSCH to the UE from a TP having transmitted CSI-RS 1 as long as there is not reconfiguration. In particular, in a situation in which CRSs are simultaneously transmitted from multiple TPs as in CoMP scenario 4, it is difficult to establish a TP-specific QC assumption through such CRSs, and accordingly information about DMRS port(s) set to establish a QC assumption with CSI-RS port(s) may be signaled so as to be utilized in improving DMRS-based reception processing performance.

For example, if the UE receives two CSI-RS configurations corresponding to CSI-RS 1 set to have a QC assumption with CRS port(s) of a specific cell (e.g., the DL serving cell) and CSI-RS 2 set to have an NQC assumption with CRS port(s) of the specific cell (e.g., the DL serving cell), the UE may determine that a QC assumption is possible between DMRS port(s) and all of CSI-RS 1 and CRS port(s) of the cell (e.g., the DL serving cell). This is because CSI-RS 1 is set to have a QC assumption with CRS port(s) of the cell (e.g., DL serving cell), and thus the UE may calculate and report CSI of higher MCS level and CQI for CSI feedback, based on CSI-RS 1 as described above. Accordingly, once the eNB sets CSI-RS 1 such that a QC assumption is possible between the corresponding CSI-RS port(s) and CRS port(s) of a cell (e.g., the DL serving cell), scheduling for the UE may be interpreted as a kind of agreement that a TP having transmitted CSI-RS 1 will transmit a DMRS-based PDSCH as long as reconfiguration is not performed. Thus, the UE may calculate and report CSI based on CSI-RS 1 for which QC is assumed, and perform reception processing of the PDSCH for which QC is assumed. Thereby, performance improvement may be expected. In other words, if there is any CSI-RS configuration allowed to have a QC assumption with CRS port(s) of a specific cell (e.g., DL serving cell), among CSI-RS configuration(s) in a CoMP measurement set, the UE may determine, in performing DMRS-based PDSCH demodulation, that a QC assumption is possible between the corresponding DMRS port(s) and the CRS port(s) of the cell (e.g., DL serving cell) (and corresponding QC-assumed CSI-RS port(s)). Thereby, performing reception processing under the QC assumption is allowed, and CSI obtained through reception processing under this QC assumption is reported.

On the other hand, if all the one or more CSI-RS configurations in the CoMP measurement set are set to have an NQC assumption with CRS port(s) of a specific cell (e.g., the DL serving cell), the UE may determine, in performing DMRS-based PDSCH demodulation, that the UE is implicitly and semi-statically instructed to assume an NQC relation between the corresponding DMRS port(s) and the CRS port(s) of the cell (e.g., DL serving cell). Thereby, the UE cannot perform an operation in consideration of a QC assumption with any other RS port(s) in performing reception processing, and CSI obtained on the assumption of reception processing according to the NQC assumption is reported.

According to another embodiment, information on specific subframe index(es) may be included in each CSI-RS configuration. Thereby, when DMRS-based DL scheduling is assigned at the subframe index(es), it may be indicated, through RRC, whether or not a QC/NQC assumption can be made between the corresponding DMRS port(s) and CSI-RS port(s) indicated by each CSI-RS configuration. Information indicating whether or not a QC/NQC assumption can be made between the DMRS port(s) and the CRS port(s) of a specific cell (e.g., the DL serving cell) may also be included. For example, if it is signaled that a QC assumption can be made between CSI-RS 1 and the DMRS port(s) in a subframe whose index is an even number, the UE may apply all or some of the estimated values of the large-scale properties of CSI-RS 1 (and/or CRS port(s) of the cell (e.g., DL serving cell)) in reception processing for the subframe having the even number index when it receives the DMRS-based PDSCH. In the case in which this information is reflected in reporting CSI, the UE may calculate CSI (e.g., an MCS level, CQI, RI and corresponding PMI with which the UE can achieve 10% FER when the UE receives a DMRS-based PDSCH later and performs data demodulation under the QC/NQC assumption between the DMRS port(s) and CSI-RS 1 (and/or the CRS port(s) of a corresponding cell (e.g., the DL serving cell)) in consideration of QC/NQC assumption, and report CSI under the QC/NQC assumption, respectively. Such information may be provided in the form of a specific subframe bitmap or a subframe index set. For example, subframe set #1 may be configured such that the QC assumption is possible between DMRS port(s) and CRS port(s) of a specific cell (e.g., the DL serving cell), and subframe set #2 may be configured such that the QC assumption is possible between DMRS port(s) and specific CSI-RS port(s). According to another embodiment, subframe set #1 may be configured such that the QC assumption is possible between DMRS port(s) and CRS port(s) of a specific cell (e.g., DL serving cell), and subframe set #2 may be configured such that NQC is assumed between DMRS port(s) and specific CSI-RS port(s).

QC Between CSI-RS and CRS of a Specific Cell and CSI Reporting

In combination of or independently from the QC assumption between the CSI-RS and each reference signal and/or a QC indication method as described above, QC between the CSI-RS and the CRS of a specific cell may be indicated.

QC between the CSI-RS and the CRS may be delivered to the UE through a CSI-RS configuration as described above, or may be delivered to the UE as separate information (e.g., information for the QC assumption, which is described in detail below).

Figure 10:
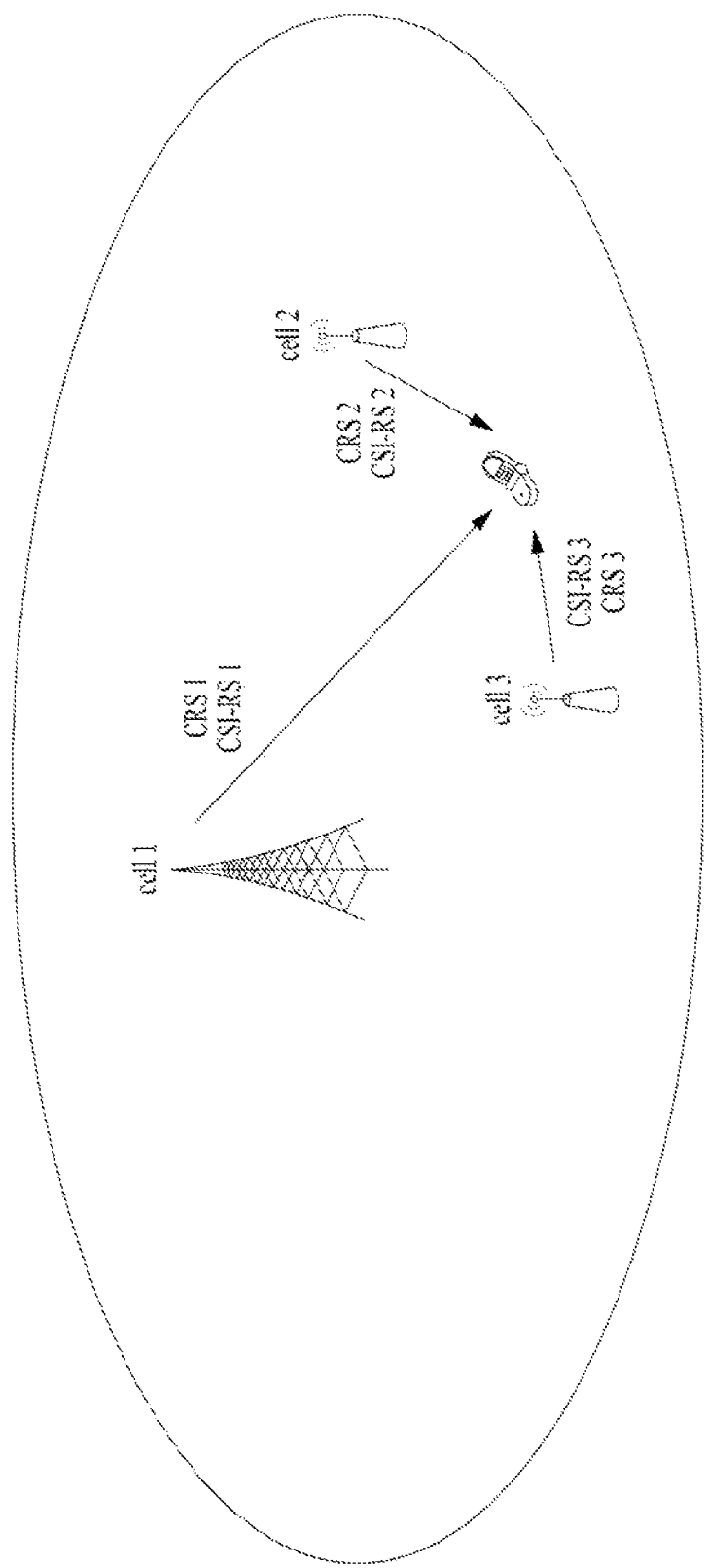
FIGS. 10 and 11 are diagrams illustrating a QC assumption and channel state reporting according to one embodiment of the present invention.

Information for the QC assumption may indicate QC-assumable physical cell ID (PCID) with respect to each of CSI-RS configurations configured to the UE. For example, as shown in FIG. 10, when three CSI-RS configurations (CSI-RS 1, CSI-RS 2, and CSI-RS 3) are configured to the UE, and cell/CRS pairs for which QC is assumable are given as cell 1/CRS 1, cell 2/CRS 2, and cell 3/CRS 3 for the respective CSI-RS configurations, the information for the QC assumption may be given as shown in Table 5.

TABLE 5

| CSI-RS configuration | PCID for QC |
| --- | --- |
| CSI-RS1 | PCID1 |
| CSI-RS2 | PCID2 |
| CSI-RS3 | PCID3 |

If there is no PCID for which QC assumption is possible with respect to a CSI-RS configuration (e.g., if cell 1 and cell 3 transmit the same CRS), the physical cell ID corresponding to the CSI-RS configuration may have a null value.

TABLE 6

| CSI-RS configuration | PCID for QC |
| --- | --- |
| CSI-RS1 | PCID1 |
| CSI-RS2 | PCID2 |
| CSI-RS3 | Null |

In contrast with to Table 6, if there is a CSI-RS configuration (CSI-RS 3) that does not have a PCID for which the QC assumption is possible, this CSI-RS configuration may be excluded as shown in Table 7 below. In other words, the information for the QC assumption may indicate PCIDs for which the QC assumption is possible, with respect to CSI-RS configurations having a QC-assumable cell among multiple CSI-RS configurations.

TABLE 7

| CSI-RS configuration | PCID for QC |
| --- | --- |
| CSI-RS1 | PCID1 |
| CSI-RS2 | PCID2 |

The information for the QC assumption described above may further include information (a serving cell rate matching flag) related to whether or not a QC assumption with a serving cell CRS is possible, as shown in Table 8. The UE may determine whether or not to take the CRS overhead from the serving cell into consideration, based on this information.

TABLE 8

| CSI-RS configuration | PCID for QC | RM flag for serving cell CRS |
| --- | --- | --- |
| CSI-RS1 | PCID1 | Flag1 |
| CSI-RS2 | PCID2 | Flag2 |
| CSI-RS3 | PCID3 | Flag3 |

In another example, as shown in Table 9, information indicating whether or not QC/NQC with a CRS of the serving cell is assumable and CRS overhead to be considered in calculating CSI may be designated for each CSI-RS configuration. For a CSI-RS configuration which is designated as QC with the serving cell CRS, only the serving cell CRS may be considered as the CRS overhead. In place of the number of CRS ports, a CRS pattern to be considered in calculating the CSI may be designated as the CRS overhead.

TABLE 9

| CSI-RS configuration | QC flag with serving cell CRS | # ports for CRS overhead |
| --- | --- | --- |
| CSI-RS1 | Flag1 | CRSport1 |
| CSI-RS2 | Flag2 | CRSport2 |
| CSI-RS3 | Flag3 | CRSport3 |

As described above, if a plurality of CSI-RS configurations (which may be included in a CoMP measurement set) is signaled to the UE through RRC, the information for the QC assumption may indicate, for each CSI-RS configuration, whether or not a QC assumption with a CRS port from a specific cell is possible, and indicate, if possible, a PCID of cell which transmit CRS.

The information for the QC assumption may also indicate whether or not a PDSCH data symbol is mapped to a CRS port from a specific cell. This information may be used in calculating a CQI.

Hereinafter, a detailed description will be given of CQI calculation and reporting of CSI containing a CQI in the case in which the UE receives the information for the QC assumption as described above.

Figure 11:
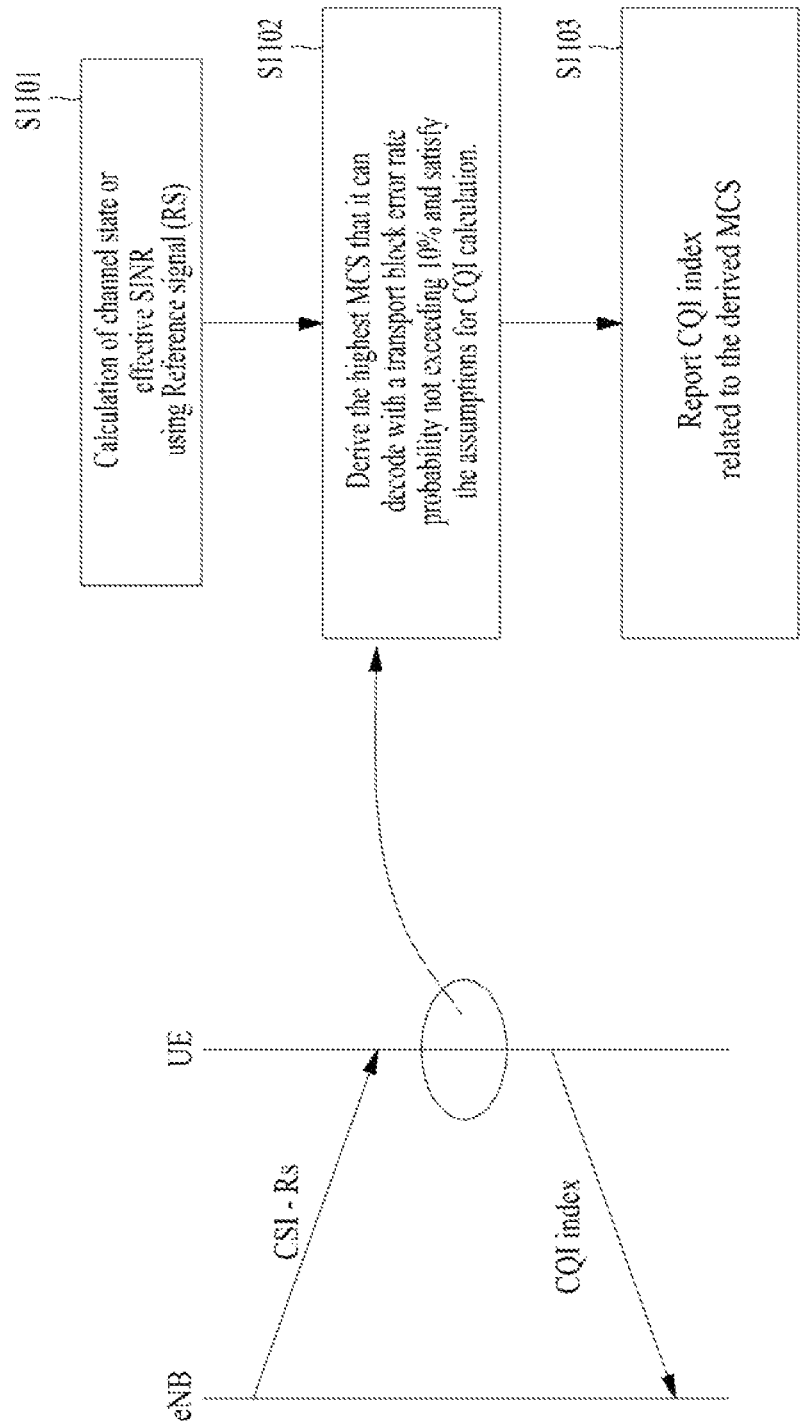

FIG. 11 illustrates a method of reporting CSI according to one embodiment of the present invention. Referring to FIG. 11, in step S1101, the UE receives a CSI-RS corresponding to one of CSI-RS configurations configured to the UE, and calculates a channel state or an effective SINR using the CSI-RS.

In step S1102, the UE derives an MCS (the size of a transport block and a modulation scheme) from the channel measurement result and information for the QC assumption.

More specifically, the UE selects an MCS that satisfies a given assumption for CQI calculation, and is close to a modulation scheme and a spectral efficiency for a CQI index shown in Table 10, and determines whether or not transmission of the MCS satisfies 10% block error rate (BLER). Then, the UE reports the highest CQI index among the CQI indexes which are expected to have BLER lower than 10% BLER.

TABLE 10

| CQI index | Modulation | Code rate x 1024 | Efficiency |
| --- | --- | --- | --- |
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

In this case, if the information for the QC assumption has a PCID corresponding to the CSI-RS, namely if there is a cell/CRS which can have a QC assumption with the received CSI-RS, the selected MCS may satisfy 10% BLER in receiving data under the QC assumption with the CRS of the cell. In addition, the information for the QC assumption is used in determining the number of REs constituting a CSI reference resource, which is an important parameter in calculating the spectral efficiency in the process of selecting the MCS. That is, when the UE calculates the number of REs constituting a reference resource, it considers the number of CRS ports of a PCID for each CSI-RS configuration. In other words, the UE may exclude REs corresponding to a CRS (port) establishing the QC assumption with the CSI-RS from calculation of the number of CSI reference resource REs. In the case in which the information for the QC assumption includes the serving cell CRS rate matching flag, CRS REs of the serving cell may also be excluded from calculation of the number of CSI reference resource REs. The UE may recognize the number of CRS ports of the PCID through a neighboring cell configuration which is delivered together with a neighboring cell list through higher layer signaling. The UE may consider assumptions given for CQI calculation in addition to the information for the QC assumption. For example, the CSI reference resource includes the following assumptions: i) first three OFDM symbols are used for a control signal, ii) there is no RE that is used by a PBCH and PSS/SSS, iii) a non-MBSFN subframe length is given, iv) if a CSI-RS is used for channel measurement, a ratio of PDSCH EPRE to CSI-RS EPRE is provided through higher layer signaling. For other details, refer to TS 36.213 (7.2.3 Channel quality indicator (CQI) definition).

Next, in step 51103, the UE may report a CQI index related to the determined MCS. That is, the UE may report the CSI including the CQI index to the eNB.

In another example, if multiple CRS patterns are designated for the UE through higher layer signaling as CRS transmission RE patterns to which data symbols cannot be mapped, and then a CRS pattern to be dynamically applied is designated through a specific field of a DCI format during reception of a PDSCH, the UE calculates CSI to report for all CSI-RS configurations, considering CRS overhead for one of the following examples as CRS overhead needed for determination of a CSI reference resource:
  A CSI reference resource is defined and CSI is calculated, assuming that CRS overhead does not exist in the CSI reference resource for all CSI-RS configuration;
  A CSI reference resource is defined and CSI is calculated, assuming that the CSI reference resource includes 4 port CRSs for all CSI-RS configurations;
  A pattern having the largest CRS overhead is selected among multiple CRS patterns designated through higher layer signaling, and a CSI reference resource is defined and CSI is calculated, assuming that there is a CRS overhead which is caused by the CRS pattern.

Figure 12:
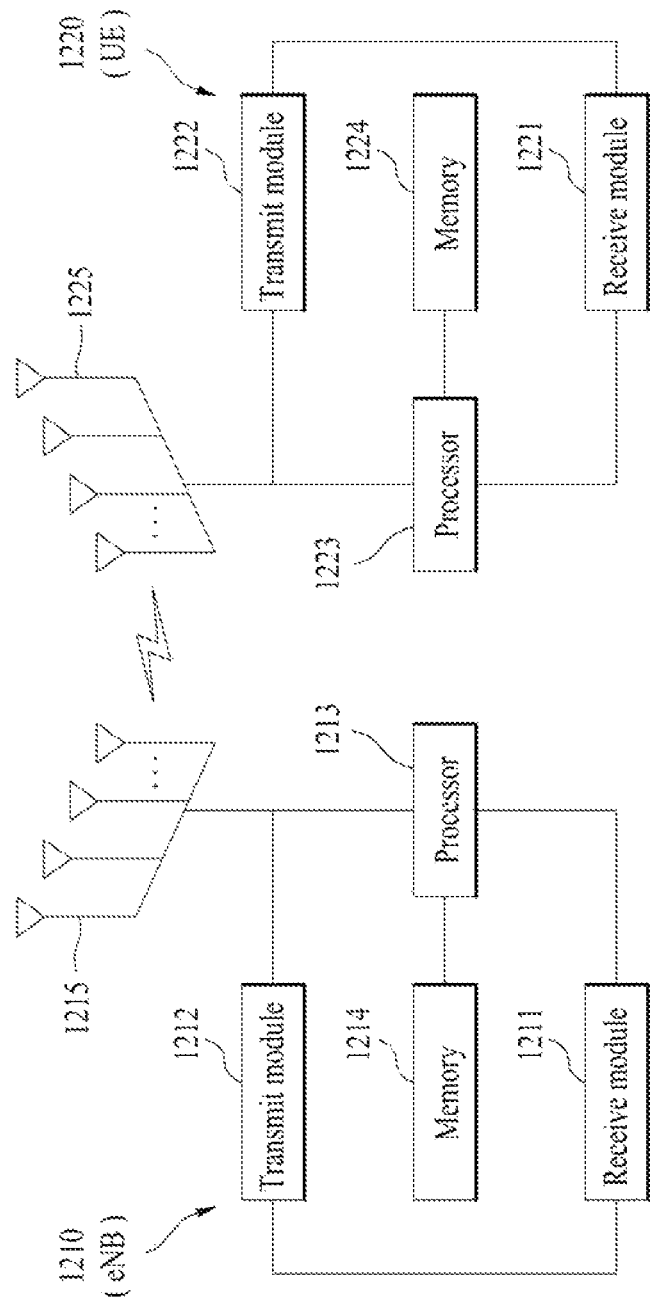
FIG. 12 is a diagram illustrating configurations of transceivers.

FIG. 12 is a diagram illustrating configurations of an eNB and a UE according to one embodiment of the present invention.

Referring to FIG. 12, an eNB 1210 may include a receive module 1211, a transmit module 1212, a processor 1212, a memory 1214, and a plurality of antennas 1215. The antennas 1215 represent an eNB that supports MIMO transmission and reception. The receive module 1211 may receive various signals, data and information from a UE on uplink. The transmit module 1212 may transmit various signals, data and information to a UE on downlink. The processor 1212 may control overall operation of the eNB 1210.

The processor 1212 of the eNB 1210 according to one embodiment of the present invention may operate to implement the embodiments described above.

Additionally, the processor 1212 of the eNB 1210 may function to operationally process information received by the eNB 1210 or information to be transmitted from the eNB 1210, and the memory 1214, which may be replaced with an element such as a buffer (not shown), may store the processed information for a predetermined time.

Referring to FIG. 12, a UE 1220 may include a receive module 1221, a transmit module 1212, a processor 1223, a memory 1224, and a plurality of antennas 1225. The antennas 1225 represent a UE that supports MIMO transmission and reception. The receive module 1221 may receive various signals, data and information from the eNB on downlink. The transmit module 1212 may transmit various signals, data and information to the eNB on uplink. The processor 1223 may control overall operation of the UE 1220.

The processor 1223 of the UE 1220 according to one embodiment of the present invention may perform operations necessary for implementation of the embodiments described above.

Additionally, the processor 1223 of the UE 1220 may function to operationally process information received by the UE 1220 or information to be transmitted from the UE 1220, and the memory 1224, which may be replaced with an element such as a buffer (not shown), may store the processed information for a predetermined time.

The configurations of the eNB and the UE as described above may be implemented such that the above-described embodiments are independently applied or two or more thereof are simultaneously applied, and description of redundant parts is omitted for clarity.

Description of the eNB 1210 in FIG. 12 may be equally applied to a relay as a downlink transmitter or an uplink receiver, and description of the UE 1220 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein.

The present invention may be carried out in other specific ways than those set forth herein without departing from the spirit and essential characteristics of the present invention.

Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention as described above are applicable to various mobile communication systems.

The invention claimed is:

1. A method for reporting channel state information (CSI) by a user equipment (UE) configured with a plurality of CSI-reference signal (RS) configurations in a wireless communication system, the method comprising:
receiving information for a Quasi Co-located (QC) assumption indicating a physical cell ID of a QC assumable cell;
measuring a channel state using a CSI-RS;
calculating a number of resource elements (REs) included in a CSI reference resource based on a number of a cell-specific reference signal (CRS) ports corresponding to the physical cell ID,
wherein the CRS ports are QC assumed with a port of the CSI-RS;
deriving a modulation and coding scheme (MCS) based on the measured channel state, the calculated number of REs and the information for the QC assumption; and
reporting the CSI containing a CQI index related to the MCS.

2. The method according to claim 1, wherein the information for the QC assumption indicates the physical cell ID of the QC assumable cell with respect to each of the CSI-RS configurations.

3. The method according to claim 1, wherein the information for the QC assumption indicates the physical cell ID of the QC assumable cell with respect to a CSI-RS configuration having a QC assumable cell among plurality of the CSI-RS configurations.

4. The method according to claim 1, wherein the number of the REs included in a CSI reference resource is calculated excluding REs overlapped with REs corresponding to the QC assumed CRS ports.

5. The method according to claim 1, wherein the information for the QC assumption further contains a serving cell CRS rate matching flag.

6. The method according to claim 5, wherein the serving cell CRS rate matching flag indicates exclusion of a resource element corresponding to a CRS port of a serving cell in calculating the number of the REs of the CSI reference resource for deriving of the MCS.

7. The method according to claim 1, wherein the MCS is a highest MCS among MCSs allowing reception of data with an error rate lower than or equal to a predetermined error rate.

8. The method according to claim 7, wherein the predetermined error rate is a block error rate (BLER) lower than or equal to 10%.

9. The method according to claim 1, wherein each of the CSI-RS configurations is included in a coordinated multi-point (CoMP) measurement set.

10. The method according to claim 1, wherein reception of the data under the QC assumption between the CRS and the CSI-RS is performed using a large-scale property estimated from a port for the CRS to perform channel estimation for the data.

11. The method according to claim 10, wherein the large-scale property comprises delay spread, Doppler spread, frequency shift, average receive power, and reception timing.

12. A user equipment (UE) configured with a plurality of channel state information (CSI)-reference signal (RS) configurations in a wireless communication system, the UE comprising:
a receiver configured to receive signals; and
a processor configured to process the signals, wherein the processor is configured to
control the receiver to receive information for a Quasi Co-located (QC) assumption indicating a physical cell ID of a QC assumable cell,
measure a channel state using a CSI-RS,
calculate a number of REs included in a CSI reference resource based on a number of a cell-specific reference signal (CRS) ports corresponding to the physical cell ID,
wherein the CRS ports are QC assumed with a port of the CSI-RS,
derive a modulation and coding scheme (MCS) based on the measured channel state, the calculated number of REs, and the information for the QC assumption, and
report the CSI containing a CQI index related to the MCS.

* * * * *